United States Patent
Parent et al.

(10) Patent No.: US 6,577,118 B2
(45) Date of Patent: Jun. 10, 2003

(54) SYSTEM AND METHOD FOR MEASURING LIQUID METAL LEVELS OR THE LIKE

(75) Inventors: Luc Parent, Chicoutimi (CA); Daniel Audet, Jonquière (CA)

(73) Assignee: B.D.H. Industries Inc., Chicoutimi (CA)

(*) Notice: Subject to any disclaimer, the term of this patent is extended or adjusted under 35 U.S.C. 154(b) by 58 days.

(21) Appl. No.: 09/776,275

(22) Filed: Feb. 2, 2001

(65) Prior Publication Data

US 2002/0105342 A1 Aug. 8, 2002

(51) Int. Cl.$^7$ ................................................ G01N 27/74
(52) U.S. Cl. ........................................ 324/204; 324/239
(58) Field of Search ........................... 164/451; 324/204, 324/207.12, 207.17, 224, 225, 227, 239, 640; 73/290 R

(56) References Cited

U.S. PATENT DOCUMENTS

| | | | |
|---|---|---|---|
| 3,366,873 A | 1/1968 | Miller et al. ................. 324/204 |
| 3,896,671 A | 7/1975 | Marinaccio ............... 73/304 R |
| 3,942,105 A | 3/1976 | Bondarenko et al. ....... 324/234 |
| 3,962,919 A | 6/1976 | Playfoot et al. ........... 73/290 R |
| 4,027,233 A | 5/1977 | Shmakov et al. ........... 324/224 |
| 4,138,888 A | * 2/1979 | Linder ...................... 73/290 R |
| 4,165,641 A | 8/1979 | Pomerantz et al. ....... 73/290 R |
| 4,186,792 A | 2/1980 | Yamada et al. ........... 73/290 R |
| 4,279,149 A | 7/1981 | Block ....................... 73/290 R |
| 4,475,083 A | 10/1984 | Linder ........................ 324/227 |
| 4,567,935 A | 2/1986 | Takeda et al. ............. 164/450.1 |
| 4,647,854 A | 3/1987 | Yamada et al. ........ 324/207.12 |
| 4,708,191 A | 11/1987 | Block et al. .............. 164/151.3 |
| 4,794,335 A | * 12/1988 | Linder ......................... 324/204 |
| 4,807,694 A | * 2/1989 | Vives et al. ................ 164/466 |
| 4,893,507 A | 1/1990 | Ciani ....................... 73/290 R |
| 4,912,407 A | 3/1990 | Gualtieri et al. ............ 324/204 |
| 4,956,606 A | * 9/1990 | Kwiatkowski et al. . 324/207.12 |
| 5,066,912 A | * 11/1991 | Kwiatkowski ............... 324/224 |
| 5,103,893 A | * 4/1992 | Naganuma et al. ......... 164/451 |
| 5,339,885 A | 8/1994 | Sinden et al. ............. 164/450.4 |
| 5,526,870 A | 6/1996 | Odegard et al. ......... 164/449.1 |
| 5,642,770 A | 7/1997 | Imthurn et al. ............. 164/420 |
| 5,977,766 A | * 11/1999 | Linder et al. ................ 324/225 |
| 6,236,198 B1 | * 5/2001 | Linder .................... 324/207.17 |

FOREIGN PATENT DOCUMENTS

| | | |
|---|---|---|
| EP | 0 087 382 | 2/1983 |
| EP | 0 077 747 | 1/1987 |

* cited by examiner

*Primary Examiner*—N. Le
*Assistant Examiner*—Walter Benson
(74) *Attorney, Agent, or Firm*—Wildman, Harrold, Allen & Dixon; Timothy J. Keefer

(57) ABSTRACT

The system and the method are used for detecting a level of liquid metal at a given location, such as a launder set between an holding furnace and a casting pit. The system comprises an emitter coil and a receiver coil in a side-by-side configuration and in close proximity of the location. In use, an AC signal is applied to the emitter coil for producing an alternating magnetic flux. At least a part of the magnetic flux passes through the location where the level of liquid metal needs to be measured and goes back into the receiver coil. The signal in the receiver coil is monitored and the data are conveyed to a control module which determines the level of liquid metal from the variation of the signal in the receiver coil. The coils of the system are advantageously provided with respective core elements having a high magnetic permeability and which are configured and disposed to channel the magnetic flux. As a result, the system is not significantly affected by the presence of steel on the frame side of the launder and is capable of determining the level of liquid metal with a high signal to noise ratio. It can also be used at other locations besides a launder.

20 Claims, 11 Drawing Sheets

SYSTEM AND METHOD FOR MEASURING LIQUID METAL LEVELS OR THE LIKE

BACKGROUND

In a casting process, the liquid metal needs at one point to be transferred from an holding furnace to the molds of a casting pit, where it is poured into the molds and cooled to make ingots or billets. The transfer of liquid metal from the holding furnace to the molds is generally made using an opened or closed channel called a launder. A launder is also called a supply gutter in some other references. A launder may further be used for transferring liquid metal from an alloying furnace, if any, to the holding furnace. As its name indicates, an alloying furnace is used for combining various metals together in the required proportions so as to prepare alloys.

The exterior walls of a launder are usually made of mild steel and constitute the frame thereof. The interior side of the frame is generally lined with a layer of compacted ceramic wool or another kind of resilient and high-temperature resistant insulating material. The portion of the launder in contact with the liquid metal is typically made of a solid refractory material. The refractory material is used to reduce the heat losses and to prevent the pick-up of contaminating materials.

The holding furnace typically contains several tons of liquid metal which need to be transferred to the casting pits over a period of time ranging from a few hours in the case of a semi-continuous process, to many consecutive days in the case of a continuous process. A key factor for the full success of a casting operation is the uninterrupted and constant supply of liquid metal during the transfer. If the metal stops from flowing or if the flow rate changes while the casting operation is under way, appropriate actions and corrective measures have to be taken immediately. As a result, the transfer and casting operation require that the level of liquid metal flowing through the launder be measured and monitored in a reliable and accurate fashion. There is thus a need for a system to continuously monitor the level of liquid metal in a launder so as to ensure that the proper amount is continuously flowing.

While some prior attempts to provide devices for measuring the level of liquid metal in a launder have resulted in a number of different constructions, none has been found completely satisfactory. For instance, some systems use a laser beam to measure the reflectivity of the launder and its contents. These systems use the surface reflectivity to obtain a signal back from the liquid metal and to measure the level thereof. However, when the surface is too shiny or when the dross is too thick, the signal is lost. Similar problems may happen when dense fumes obscure the region above the launder. Some other systems use the electrical capacitance of the launder and its contents. However, there is a suitable response only for a few inches and this is generally not sufficiently precise nor accurate in many applications. There is also a low signal to noise ratio, making it difficult to obtain an accurate value of the liquid metal level.

SUMMARY

The object of the present invention is to reduce the difficulties and disadvantages experienced with prior systems by providing an improved system and a method for measuring liquid metal levels in a launder or any similar locations where such measurements need to be undertaken. An important aspect of the present invention is that it is not significantly affected by the presence of steel on the exterior side of the launder. It is further stable in the harsh environment of a cast house and may work even if there is no external cooling.

The full extent of the present invention will be more readily apparent from the following detailed description of preferred embodiments thereof, which proceeds with reference to the accompanying figures.

DETAILED DESCRIPTION

Figure 1:
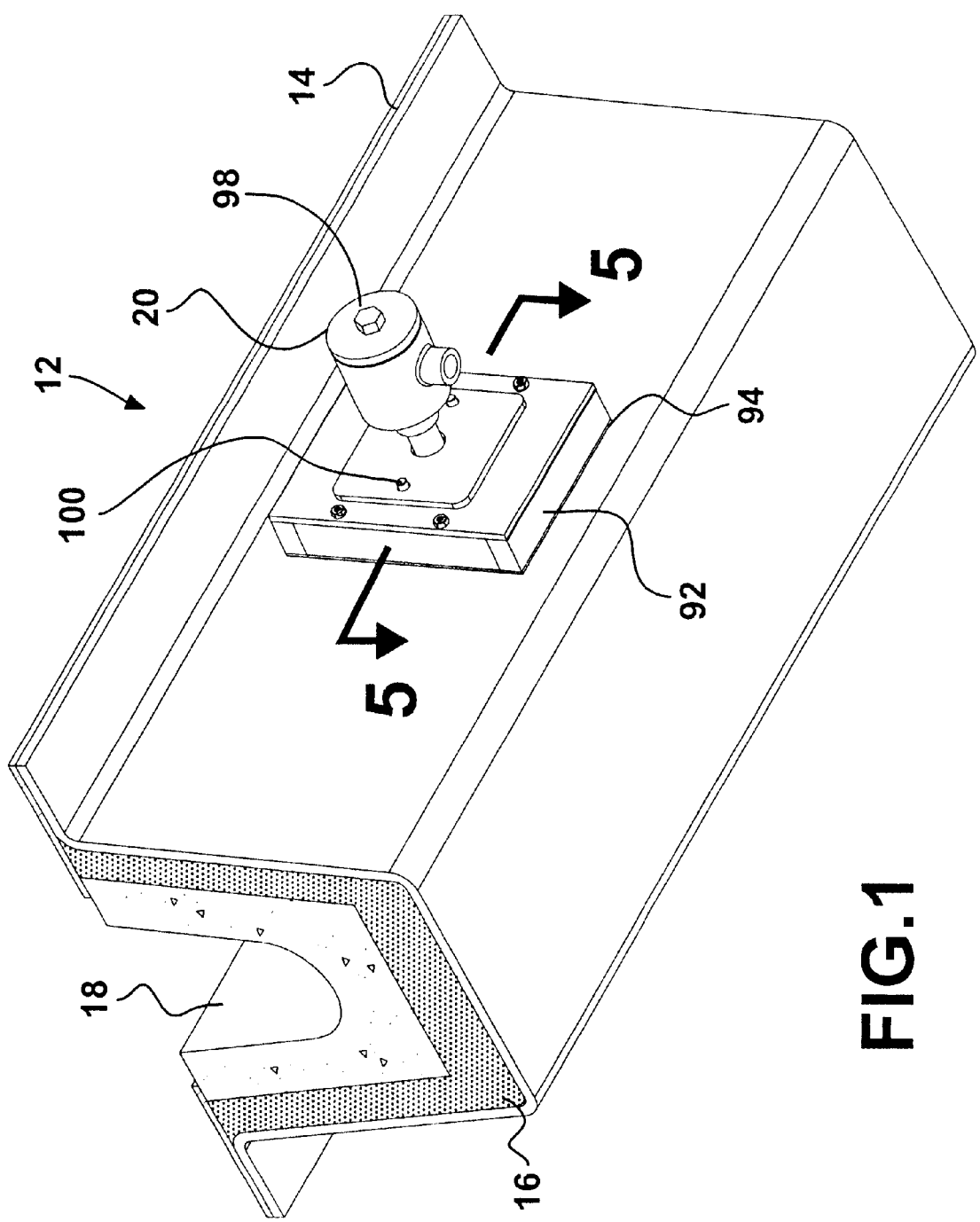
FIG. 1 is a perspective view of a typical launder with a probe mounted on the side thereof, in accordance with a first and preferred embodiment of the present invention.

A system (10) according to a possible and preferred embodiment of the present invention is described hereinafter and illustrated in the accompanying figures. Throughout these figures, analogous components are identified by the same reference numerals.

Figure 2:
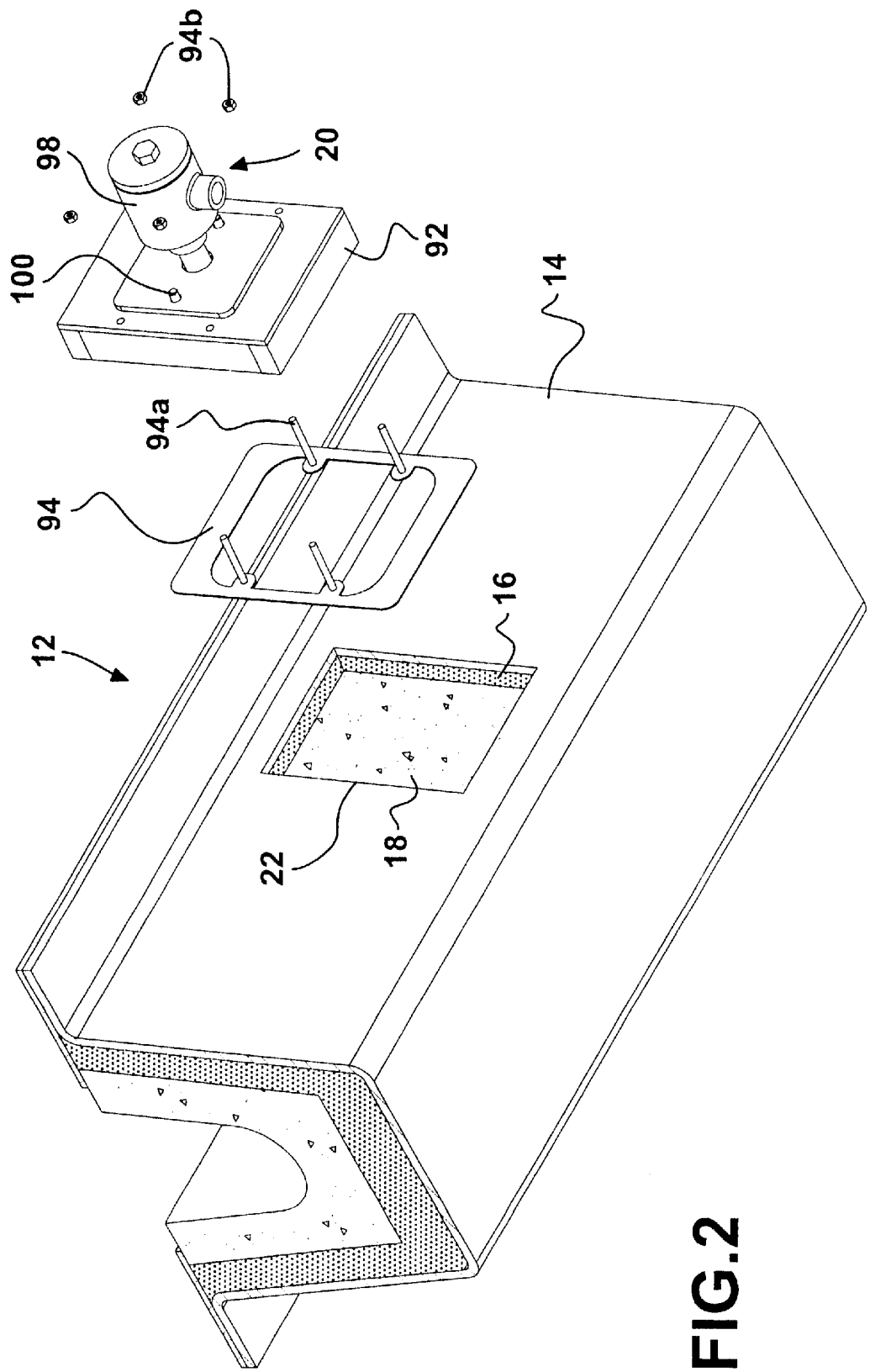
FIG. 2 is an exploded perspective view of the probe with the launder illustrated in FIG. 1, showing the aperture over which the probe is mounted.
Figure 3:
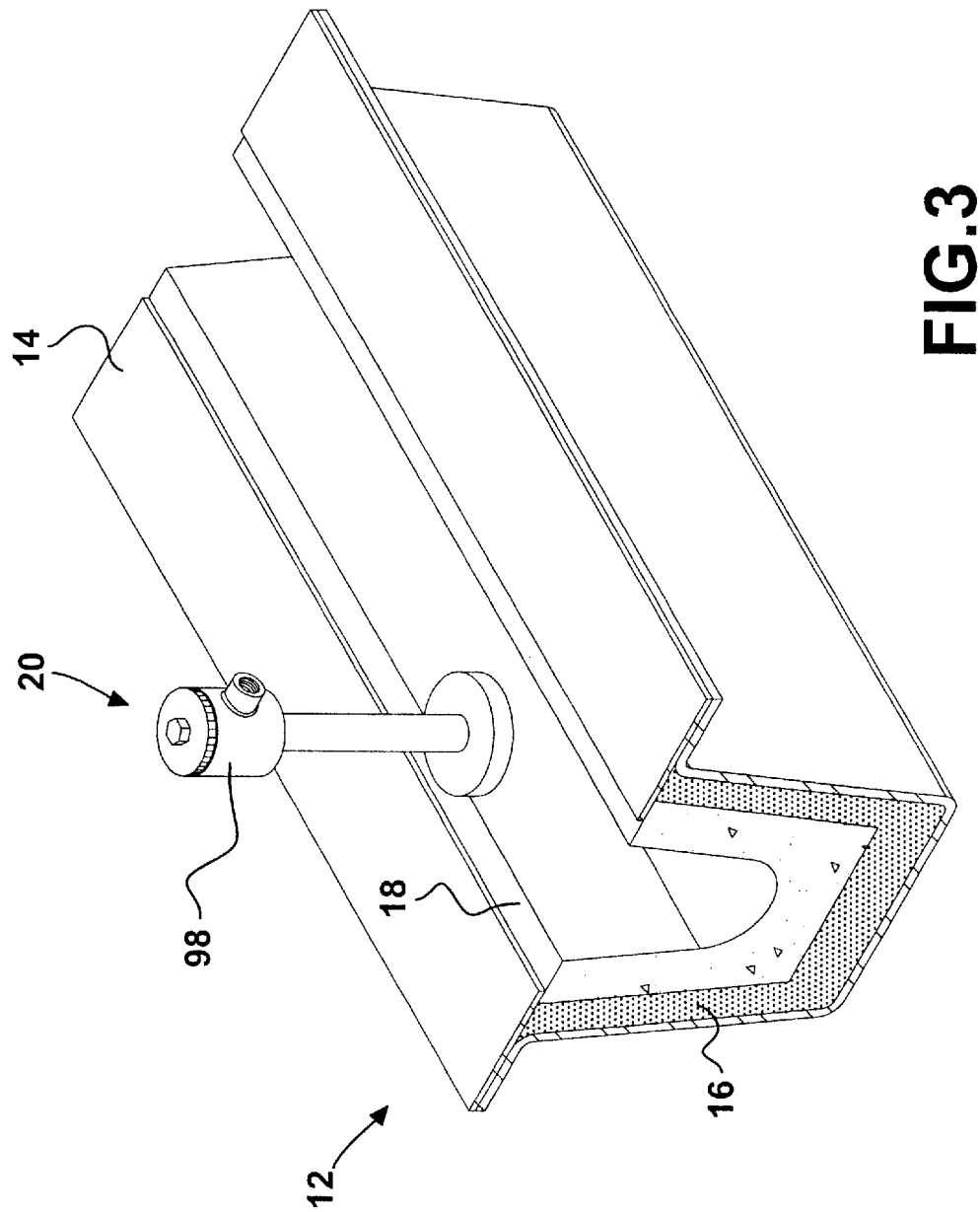
FIG. 3 is a perspective view of a typical launder with a probe in an overlying disposition in accordance with another possible embodiment of the present invention.

FIGS. 1 to 3 show an example of a typical launder (12) which constitute the main location where the present invention can be used. However, it should be understood that the present invention is not limited for its use with a launder and can thus be used elsewhere. For instance, it can be used in conjunction with molds, electrolytic cells or any other suitable location.

As aforesaid, the exterior walls (14) of a launder (12) are usually made from mild steel and constitute the frame thereof. The interior of the launder (12) is lined with a layer of compacted ceramic wool (16). The portion of the launder (12) in contact with the liquid metal is made of a solid refractory material (18). When a liquid metal flows in the launder (12), the temperature of the frame (14) typically increases from room temperature to about 200° C. in the case of aluminum. Since the refractory material (18) and the frame (14) do not have the same thermal expansion coefficient, they expand at different rates, creating a relative displacement between them. The intermediate layer of compacted ceramic wool (16) allows the dissimilar expansions to be compensated, thereby ensuring that the refractory material (18) be held properly in position throughout all the range of temperatures. It also provides some thermal insulation in addition to that provided by the refractory material (18).

The system (10) comprises a probe (20) which is held close to the location where the liquid metal is present. The probe (20) essentially comprises a sensor assembly and a fastening assembly. FIG. 1 shows how the exterior parts of the fastening assembly are held against one of the walls (14) of the launder (12). It should be noted that it is also possible to mount the probe (20) above the launder (12) instead of mounting it on a lateral side thereof. FIG. 2 shows that the probe (20) in FIG. 1 is held over an aperture (22) made through the frame (14) of the launder (12). This aperture (22) is either cut using a torch or a saw for instance, or is a part of a launder designed for that purpose. The removed section is as small as possible so as to prevent the structure from weakening. A typical width for the aperture (22) is 168 mm. The ceramic wool (16) is also removed from the aperture (22) so as to expose the outer side of the refractory material (18).

FIG. 3 shows another possible embodiment of the present invention. This embodiment is characterized in that the probe (20) is located over the center of the launder (12). The probe (20) is held in place using appropriate fasteners, as apparent to a person skilled in the art. Example of fasteners for this purpose include brackets, rods, plates and/or others, all of which are located as far as possible from the probe (20) or made of a material having no significant effect on a magnetic flux.

The present invention is based on electrical inductance. Inductance is the phenomenon where a changing electrical current in one electrical circuit builds a magnetic field which is capable of inducing an electromagnetic force and an opposing current in an adjacent circuit. These circuits are in the form of coils in the present invention.

Figure 4:
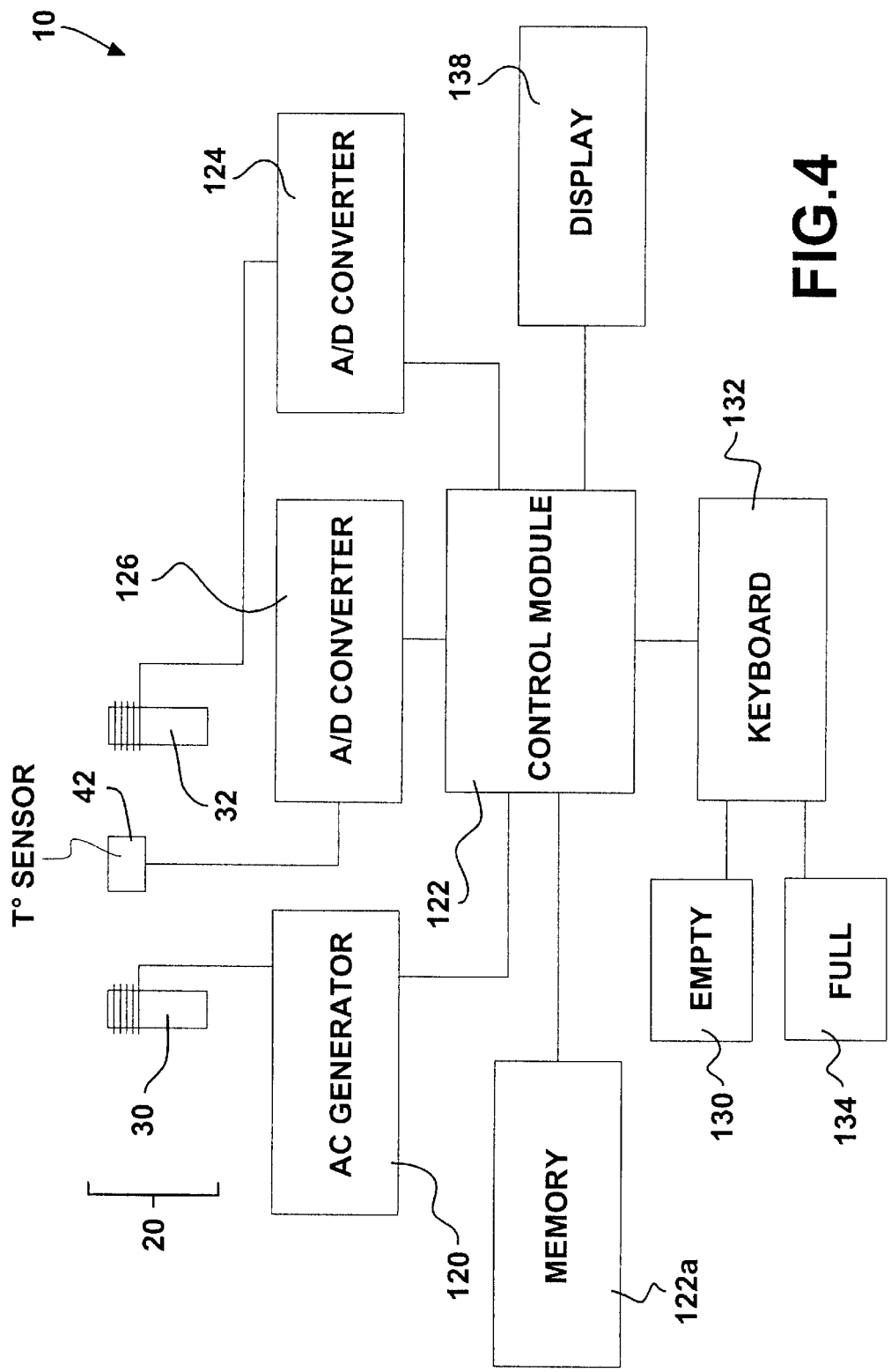
FIG. 4 is a block diagram showing the preferred connections between the components.

FIG. 4 schematically represents the preferred connections of the electrical components. It illustrates the two coils (30,32) having a side-by-side configuration, which means that they are on a same side but are spaced-apart from each other. One coil is an emitter coil (30) and the other is a receiver coil (32). Each coil (30,32) comprises a wire wound around itself numerous times, preferably around the edge of a respective core element (34,36). The wire winding is made along the length of the core elements (34,36). These core elements (34,36) are preferably in the form of plates, but other forms or shapes are also possible. They could also be slightly concave or convex instead of being flat plates.

The core elements (34,36) are made of a material having a high magnetic permeability and which can transmit the magnetic flux towards the interior of the launder (12) where the measurements are taken. Such material should have a B/H value, representing the magnetic permeability, between 10 000 and 1 000 000. It also has to resist the temperatures reached inside the probe (20). An example of a suitable material is the one known as MuMetal™ or Hy Mu 80™, and which typically contains nickel (80%), iron (15%), Molybdenum (4.2%), Manganese (0.5%) and carbon (0.02%). Heat-treating the alloy in dry hydrogen to increase the grain size enhances the magnetic properties of the material. Other materials can be used as well, such as the ones known as Magnifier 7904™, Permalloy™, Hypernom™, etc.

Preferably, the core elements (34,36) are disposed such as to have their longitudinal axis being somewhat perpendicular to the flow direction of liquid metal. However, each of the core elements (34,36) can be set at an angle which varies from about 30 degrees on both sides of a perpendicular position.

Briefly stated, the emitter coil (30) is used to generate an alternating magnetic flux. Both coils (30,32) are arranged and disposed in a way that the alternating magnetic flux from the emitter coil (30) induces a voltage signal in the receiver coil (32). They are also held in close proximity of the location of liquid metal. In the case of the launder (12), the coils (30,32) are held close against the side of the refractory material (18). The magnetic flux is carried through the refractory material (18) and then across the path of liquid metal. There is thus no direct contact between the coils (30,32) and the liquid metal, the system (10) working completely in a remote manner.

The receiver coil (32) continuously receives a signal from the emitter coil (30) even if the launder (12) is empty. However, the overall signal through the receiver coil (32) increases in presence of liquid metal. This changes the signal measured in the receiver coil (32) and ultimately allows the system (10) to determine the level of liquid metal upon analysis of the variation of the signal measured in the receiver coil (32).

The present invention can be used with a very wide range of metals, including and not limited to aluminum, brass, copper, iron, lead, magnesium, steel, titanium, zinc and many others, or their alloys. Furthermore, although the system (10) is primarily intended for use with liquid metals, it can also be used with melted salts that are electric conductors.

Figure 5:
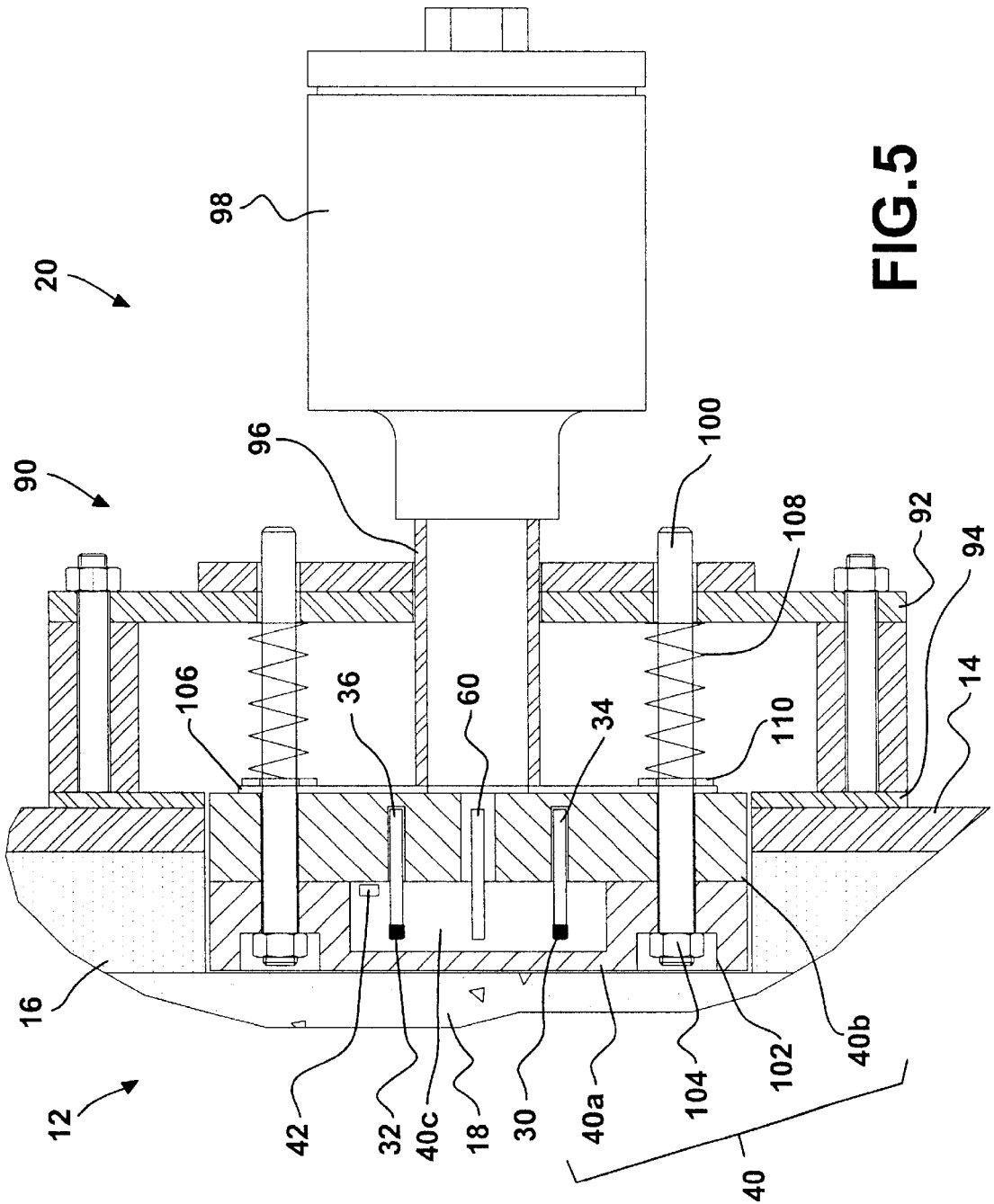
FIG. 5 is a cross-sectional view of the probe and the frame of the launder, as taken along line 5—5 in FIG. 1.

Referring to FIG. 5, there is shown a cross-sectional view taken from the top of the launder (12) illustrated in FIG. 1. It shows the sensor assembly, which is located inside the probe (20). In addition to the coils (30,32), the sensor assembly comprises a two-part hollow receptacle (40), which is designed to hold and protect the two coils (30,32). Both parts (40a,40b) of the receptacle (40) are made of a ceramic material or any other suitable material having no or only a weak effect on an electromagnetic signal to be sent from the emitter coil (30) to the receiver coil (32).

Figure 6:
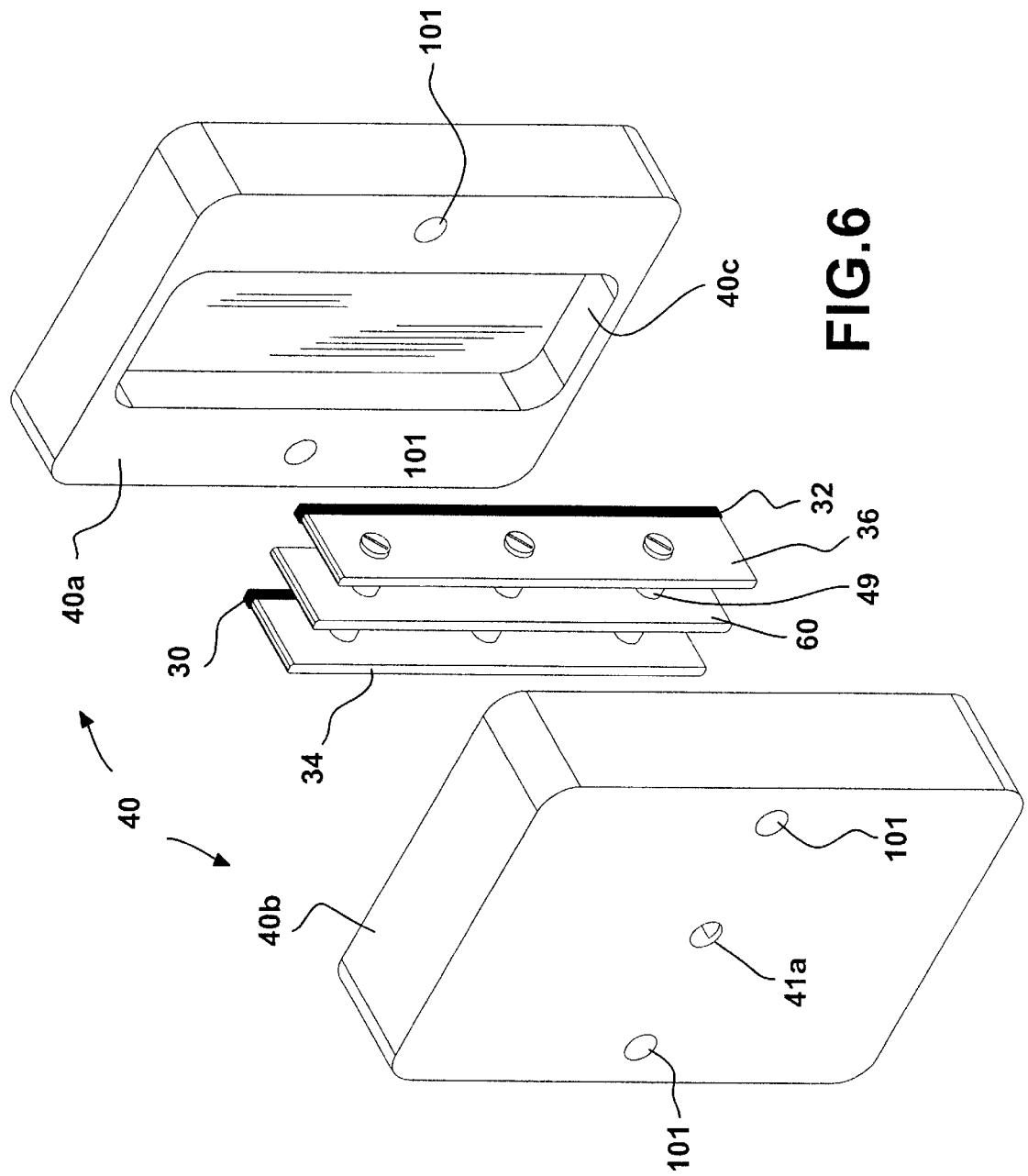
FIG. 6 is an exploded perspective view of some of the parts of the sensor portion of the probe, in accordance with a preferred embodiment of the present invention.
Figure 7:
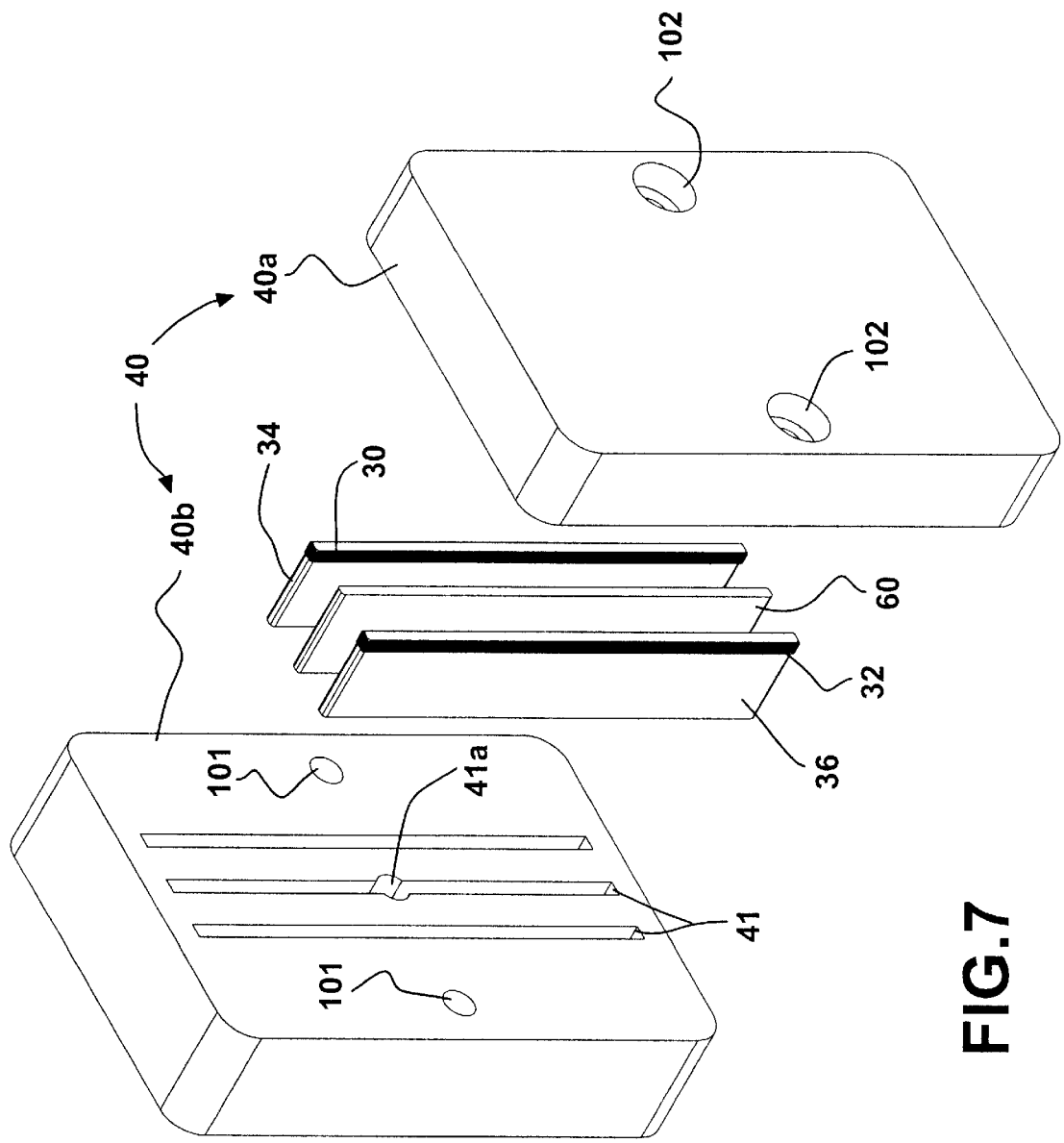
FIG. 7 is a view similar to FIG. 6, showing the parts from another angle.

FIGS. 6 and 7 show the two parts (40a,40b) of the receptacle (40) being separated from each other. They are preferably made of a carbon-carbon composite, such as the one known under the trade name "K-Karb" from Kaiser Compositek. It has been found that this material has the required mechanical properties at high temperature and no adverse effect on the signal. It is further capable of withstanding the harsh environment of a cast house. Other materials, such as alumina, silica, mullite, any combinaison of alumina with silica or zirconia, are also suitable candidates for the construction of the receptacle (40). The receptacle (40) is provided with a hollow internal housing (40c). Slots (41) are provided in the second part (40b) to hold the corresponding core elements (34,36). The slot in the middle is used for an optional third core element (60), which is described later. Advantageously, the middle slot is provided with a hole (41a) to accommodate the wires that need to reach the housing (40c).

As best shown in FIG. 5, there is also provided a temperature sensor (42) within the housing (40c) in order to measure the temperature in the vicinity of the coils (30,32).

The temperature sensor (42) preferably comprises either a thermocouple or a resistivity thermal device (RTD). The selection between the two kinds of temperature sensors is essentially dependent upon the highest temperature reached in the housing (40c). A RTD is preferred when the temperature is about 400° C. or less since it is less expensive than a thermocouple. It should be noted that the electrical wires have been omitted from FIG. 5 for clarity purposes. Each coil (30,32) has two electrical wires and the temperature sensor (42) has also two. A total of six electrical wires are coming out of the sensor assembly.

The wire used in constructing the coils (30,32) has to be electrically insulated but the interior portion has to be a good electrical conductor. It further has to resist to high temperature oxidation. Hence, copper can not be used alone since it rapidly losses its electrical conductivity as it becomes oxidized due to in the environment and high temperatures in cast houses.

When the temperature inside the probe (20) does not exceed about 400° C., a nickel-clad copper or aluminum wire can be used. The nickel-clad copper wire preferably has a diameter between 0.15 and 1.0 mm. A wire made of aluminum should have a purity of 99.5% or higher in order to be a good conductor. The aluminum wire preferably has a diameter between 0.25 and 1.5 mm in diameter, the most preferred diameter being between 0.5 and 0.8 mm. The electrical insulator covering the wire may be a glass or mica sheath. For aluminum, alumina obtained by anodization could be used. A very suitable form of anodized aluminum is the one commercially obtained from Alumat Inc. (Ponoma, Calif.), which allows the wire to be shaped without breaking the layer of alumina. Other materials can be used as well.

Figure 8:
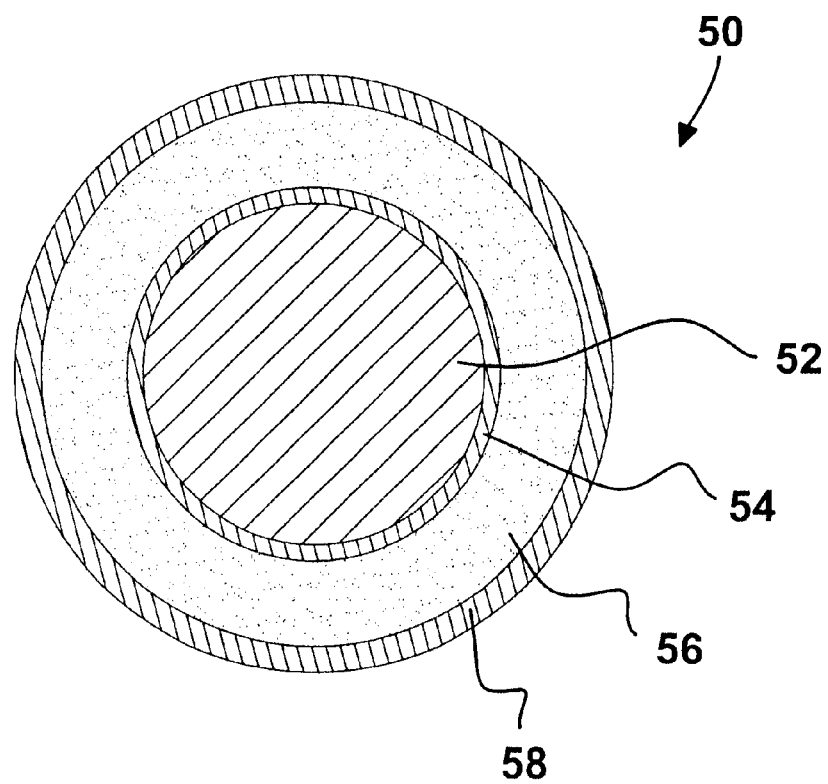
FIG. 8 is a cross-sectional view of a double-sheathed wire, in accordance with another aspect of the present invention.

When the temperature inside the probe could exceed about 400° C., the wires used in the coils (30,32) have to be designed to withstand high temperatures. This could be achieved using a double-sheathed wire (50) made in accordance with another aspect of the present invention. FIG. 8 shows an example of a cross-section of this double-sheathed wire (50). It could be prepared in one step by a conventional cold drawing system.

The double-sheathed wire (50) preferably comprises a copper or pure nickel core (52). The core (52) comprises a first seamless sheath (54) made of a high nickel-base content alloy or other malleable non-oxidizing alloys. Preferably, the first sheath (54) is made of an Inconel™ 600 alloy. The core (52) and the first sheath (54) are enclosed within a second sheath (56), preferably made of the same material as the first sheath (54). These components are coaxially disposed and are further provided with an annular space (58) between them. This space (58) is preferably packed with an electrically insulting and high temperature resistant material to prevent them from being in electrical contact. This material is preferably a ceramic powder, such as magnesium oxide (MgO). Other materials could be used as well.

The double-sheathed wire (50) preferably has an outside diameter between 0.8 and 2.0 mm, most preferably between 1.0 and 1.5 mm. The inside diameter of the second sheath (56) is preferably between 0.4 and 1.6 mm, most preferably between 0.6 and 1.1 mm. Typically, the resistivity of a 1.0 mm outside diameter double-sheathed wire (50) with a nickel clad-copper core is about 1.7 milliohm per cm at room temperature. This increases to about 10 milliohms per cm at 1100° C. It has been found that this wire (50) can be used for several weeks in oxidizing atmospheres having a temperature up to 1100° C. It should be noted that the double-sheathed wire (50) could also be used in other high temperature applications.

Generally, the length of the core elements (34,36) determines the height of liquid metal that can be measured. For example, core elements (34,36) having 150 mm in length can measure between 1 and 150 mm of liquid metal. Core elements (34,36) typically can be made from 5 mm to 800 mm in length and have windings between 30 and 200 turns. The preferred number of turns is between 60 and 120, the most preferred being about 90.

The thickness of the core elements (34,36) is also an important parameter. Thick coils produce a magnetic field that occupies a large volume. If the magnetic field is too wide, then it would go through the steel frame (14) of the launder (12). This is undesirable since the temperature of the frame (14) changes drastically during a cast, causing a signal drift. For example, during a normal cast of aluminum, the temperature of the frame (14) of the launder (12) increases from room temperature to 200° C.

While reducing the thickness of the core elements (34,36) decreases the part of the magnetic field going through the frame (14), it has the drawback of decreasing the signal strength. This undesirable effect is due to the fact that the magnetic field created on one side of the emitter coil (30) is opposite the one created by the other side thereof. The result is that the magnetic field transmitted to the receiver coil (32) would have a lower intensity. The first (34) and the second (36) core elements are allowing to solve this problem. Moreover, for keeping an even higher intense and concentrated field, a third core element (60) may be placed between the two coils (30,32). The third core element (60) is preferably made of the same material than that of the other core elements (34,36) or an equivalent. It contributes to further focussing the magnetic field through the center aperture (22), thereby reducing its interaction with the frame (14) of the launder (12). Spacers (49) are preferably used to maintain the spacing between all core elements (34,36,60).

Preferably, as shown in FIGS. 5 to 7, the third core element (60) is placed perpendicular to the coils axis. It is in the form of a sheet having between about 50 and 280 mm in length, between about 15 and 50 mm in height, and between about 0.1 and 5 mm in thickness. With the third core element (60), the distance between the two coils (30,32) is typically from 5 to 30 mm, depending on their length, compared to between 50 and 75 mm without a third core element. The third core element (60) also enables the system (10) to measure the effect of the inductance in the liquid metal at a distance of up to 100 mm away from the probe (20) into the launder (12). Concentrating the magnetic flux at the center of the aperture (22) decreases the distance between the coils (30,32) and reduces the portion of magnetic flux going through the frame (14) of the launder (12). The effect of the surrounding steel thus becomes negligible when the third core element (60) is placed between the two coils (30,32).

As aforesaid, the probe (20) needs to be held in place while it is used. It is necessary that the sensor assembly of the probe (20) be held so that the distance between the coils (30,32) and the liquid metal does not change. The contrary would cause a signal drift and thus give an incorrect indication of the liquid level. When the probe (20) is above the launder (12), there is no significant change throughout the use of the system (10). However, when the probe (20) is installed on the frame (14) of the launder (12), the fastening of the probe (20) requires some attention because the relative distance between the frame (14) and the center of the launder (12) changes with the thermal expansion. To solve the above-mentioned problem, a novel fastening assembly (90) has been devised so as to allow the sensor portion of the probe (20), and thereby the coils (30,32), to be held at a constant distance from the outer side of the refractory material (18). This keeps the distance between the coils (30,32) and the liquid metal as constant as possible over the range of temperatures.

The fastening assembly (90) preferably comprises a protective cover (92) that is made of a ceramic material or a carbon-carbon composite material. Other suitable materials can be used as well. The cover (92) is removably mounted around the aperture (22) made through the frame (14) of the launder (12). To achieve this, the fastening assembly (90) preferably comprises a fixation frame (94) welded around the aperture (22). This fixation frame (94), shown in FIG. 2, is preferably made of stainless steel 300 series and comprises fastening bolts (94a) projecting therefrom. Other materials can be used as well. Referring now to FIG. 5, the protective cover (92) is inserted over the fixation frame (94) and the bolts (94a) are inserted through corresponding holes in the cover (92). The free end of the bolts (94a) protrudes from the exterior of the cover (92) and nuts (94b) are used to lock the cover (92) in position.

The central portion of the cover (92) is preferably provided with three holes. One is to accommodate a tube (96) through which the electrical wires will run. FIGS. 1 to 3 and 5 show that the tube (96) ends with an enlarged adapter (98) in which the terminals of the electrical wires of the probe (20) are connected to corresponding external wires. The other side holes (101) are receiving corresponding bolts (100). The tube (96) and the bolts (100) are free to slide in their respective hole. These bolts (100) are preferably made of stainless steel but made be made of other suitable alloys. One end of the bolts (100) is threaded and is located in corresponding chamfers (102) made on the face of the receptacle (40) in engagement with the refractory material (18). Nuts (104) are provided on these ends. The bolts (100) are also rigidly connected to a plate (106) located at the back of the other part of the receptacle (40). This rigid connection is achieved, for instance, by welding the bolts (100) to the plate (106). The plate (106) is preferably made of stainless steel. A compression spring (108) is coaxially mounted around each bolt (100), between the interior wall of the cover (92) and a washer (110) resting against the plate (106) at the back of the receptacle (40). The bolts (100) act as guide rods to keep the probe (20) in registry with the aperture (22) as the launder expands or contracts. The compression springs (108) provide a force which is constantly applied on the receptacle (40) to keep it in engagement against the side wall of the refractory material (18) even when the frame (14) and refractory material (18) expand at different rates. It should be noted that the cover (92) should be designed to contain spillage of liquid metal in the event that the refractory material (18) breaks in the region of the aperture (22).

Referring now to FIG. 4, the emitter coil (30) receives a signal from an AC generator (120) in the form of a constant AC current. The AC generator (120) is controlled by a control module (122), consisting for example of a computer. The control module (122) is used to control the operation of the system (10) and calculate the change in inductance into a value that is proportional to the level of liquid metal in the launder (12). The signal sent to emitter coil (30) is preferably in the form of a sinusoidal wave having a frequency between 0.1 and 10 kHz. The preferred frequency is 1 kHz with a current of 500 mA. At the same time, the control module (122) measures the inductance in the receiver coil (32) and the temperature in the housing (40c) of the receptacle (40). The receiver coil (32) and the temperature sensor (42) are connected to corresponding analog-to-digital converters (124,126), themselves connected to the control module (122).

Figure 9:
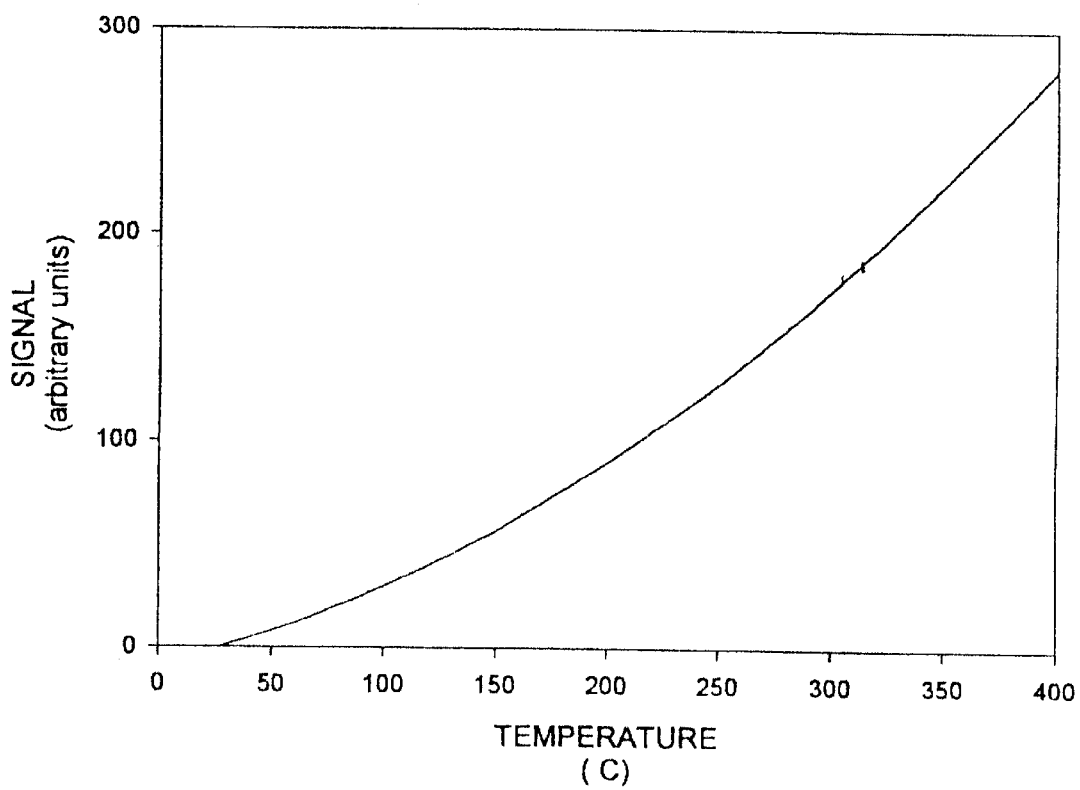
FIG. 9 is a graph showing the effect of the temperature inside the receptacle of the probe on the signal sensed by the receiver coil.

The system (10) is preferably calibrated in two steps. In the first step, the probe (20) is calibrated by heating it in the controlled environment of a furnace. The signal values are recorded from room temperature to 400° C., for instance. FIG. 9 shows a typical relationship between the signal and temperature of a 150 mm probe. A second order equation of the relationship between signal and temperature is calculated from the results and is downloaded in the non-volatile memory (122a) of the control module (122).

Figure 10:
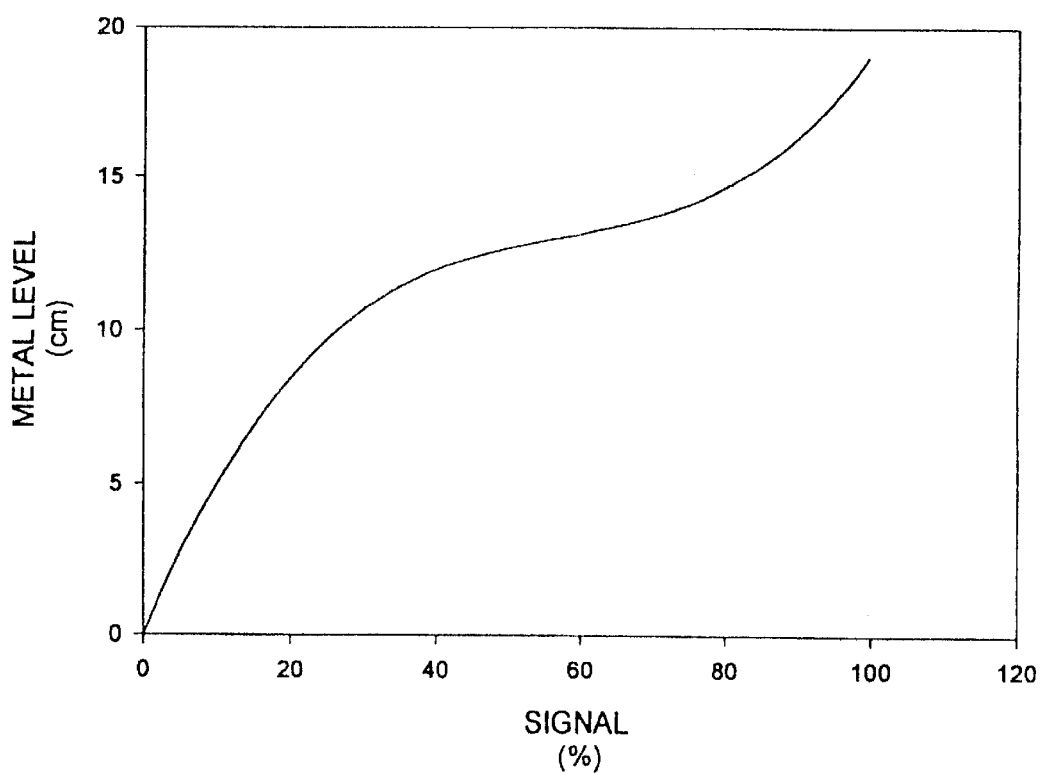
FIG. 10 is a graph showing an example of the relationship between the signal in the receiver coil and the level of metal in the launder.

In the second step, the user enters the lower and higher signal that will be measured by the system (10). It is done for instance by pressing an "Empty" button (130) on a keyboard (132) when the launder (12) is empty. At this time, the lower signal value and the temperature are recorded in the non-volatile memory (122a). The user then places a plate (not shown), which is larger that the core length, in the launder (12). The plate preferably has a thickness of at least 4 mm and is made of the same metal or alloy to be transferred, for example a plate of aluminum if aluminum is used. Once the plate is in place, the user presses the "Full" button (134) on the keyboard (132) and the higher signal and the temperature are recorded in the non-volatile memory (122a). FIG. 10 shows a typical relationship between the aluminum level and the relative signal of a 150 mm probe. The relationship is preferably described by a third order equation. This equation is downloaded in the non-volatile memory (122a) to be used during the calculations.

In use, the system (10) generates and measures the inductance and makes corrections for the change in temperature of the probe (20). It reads the probe signal and the temperature. The control module (122) compares the temperature with the temperature used in calibration. The signal values are then corrected according to the temperature equation. After temperature correction, the system (10) calculates the level using, for instance, the third order equation and the lower and higher values recorded by the user. The level is finally displayed or recorded in a display device (138). Furthermore, preset values can be provided to trigger alarm signals whenever the level reaches these values.

Example of Calibration

A probe with a span of 150 mm was fixed on the side of the wall of a launder. Two equations have been downloaded into the non-volatile memory of the control module. The first equation was the one relating to the signal with reference to the temperature. This first equation was expressed as:

$$S_{(T)} = (0.25 \times T) + (1.17 \; 10^{-3} \times T^2) - 7.4 \quad (1)$$

where T is the temperature in °C. and $S_{(T)}$ is the signal correction for a temperature. The second equation was the one for the determination of the metal level. This second equation was:

$$\text{Metal level (mm)} = (5.9 \times S_{(\%)}) - [9.5 \times 10^{-2} \times (S_{(\%)})^2] + [5.5 \times 10^{-4} \times (S_{(\%)})^3] \quad (2)$$

When the probe was fixed on the launder, the user pressed the "EMPTY" button. At that moment, the signal value and temperature were recorded in the non-volatile memory. A value of 20 000 arbitrary units ($V_{(EMPTY)}$) was recorded at a temperature of 40° C. The user then placed the aluminium calibration plate in the launder and pressed the "FULL" button. A value of 21,000 arbitrary units was recorded ($V_{(FULL)}$).

During operation, a value of 21 551 arbitrary units and a temperature of 150° C. were measured. The processor of the control module then calculated the $S_{(T)}$ from equation (1) at 40° C. and 150° C., which gave values of 5 and 56 arbitrary units, respectively. Then, the variation of signal relative to temperature, called ΔS, was given using the following equation:

$$\Delta S = S_{(150°C.)} - S_{(40°C.)} \quad (3)$$

ΔS was equal 51 arbitrary units. The processor had to determine whether the operation temperature was higher or lower than the calibration temperature. If the operation temperature was higher than the calibration temperature, then the equation (4) had to be used. If the operation temperature was lower than calibration temperature, then the equation (5) had to be used. In the case, equation (4) was used, giving a value for V (corr) of 21 500 arbitrary units. This value was then used for measuring the metal level.

$$V (corr) = V \text{ measured} - \Delta S, \text{ for } T \text{ calibration} < T \text{ operation} \quad (4)$$

$$V (corr) = V \text{ measured} + \Delta S, \text{ for } T \text{ calibration} > T \text{ operation} \quad (5)$$

The signal percentage $S_{(\%)}$ was given using the following equation:

$$S_{(\%)} = [(V(corr) - V_{(EMPTY)})/(V_{(FULL)} - V_{(EMPTY)})] \times 100\% \quad (6)$$

where $V_{(EMPTY)}$ is the value measured during the calibration EMPTY and $V_{(FULL)}$ is the value measured during the calibration full. In that case, $S_{(\%)}$ equalled 50. The metal level was calculated using this value in equation (2). That gave a value of 126 mm.

Of course, the foregoing equations were only given as examples and others can be devised by a person skilled in the art.

Example of Use

The sensitivity and precision of a system (hereinafter "the system") constructed in accordance with the present invention were compared with that of a commercially available device which was based on the measurement of capacitance. In this comparative test, the probe of the system was similar to that used in example of calibration, that is with a span of 150 mm. It featured an emitter coil and a receiver coil of 90 windings operating at the frequency of 1 kHz and with a current of about 500 mA. The probe was calibrated by the procedure described earlier. It was installed in the side of a launder through which was flowing an AA 5000 series aluminum alloy. The temperature of the metal was 750° C., and the temperature of the frame of the launder was about 150° C.

Figure 11:
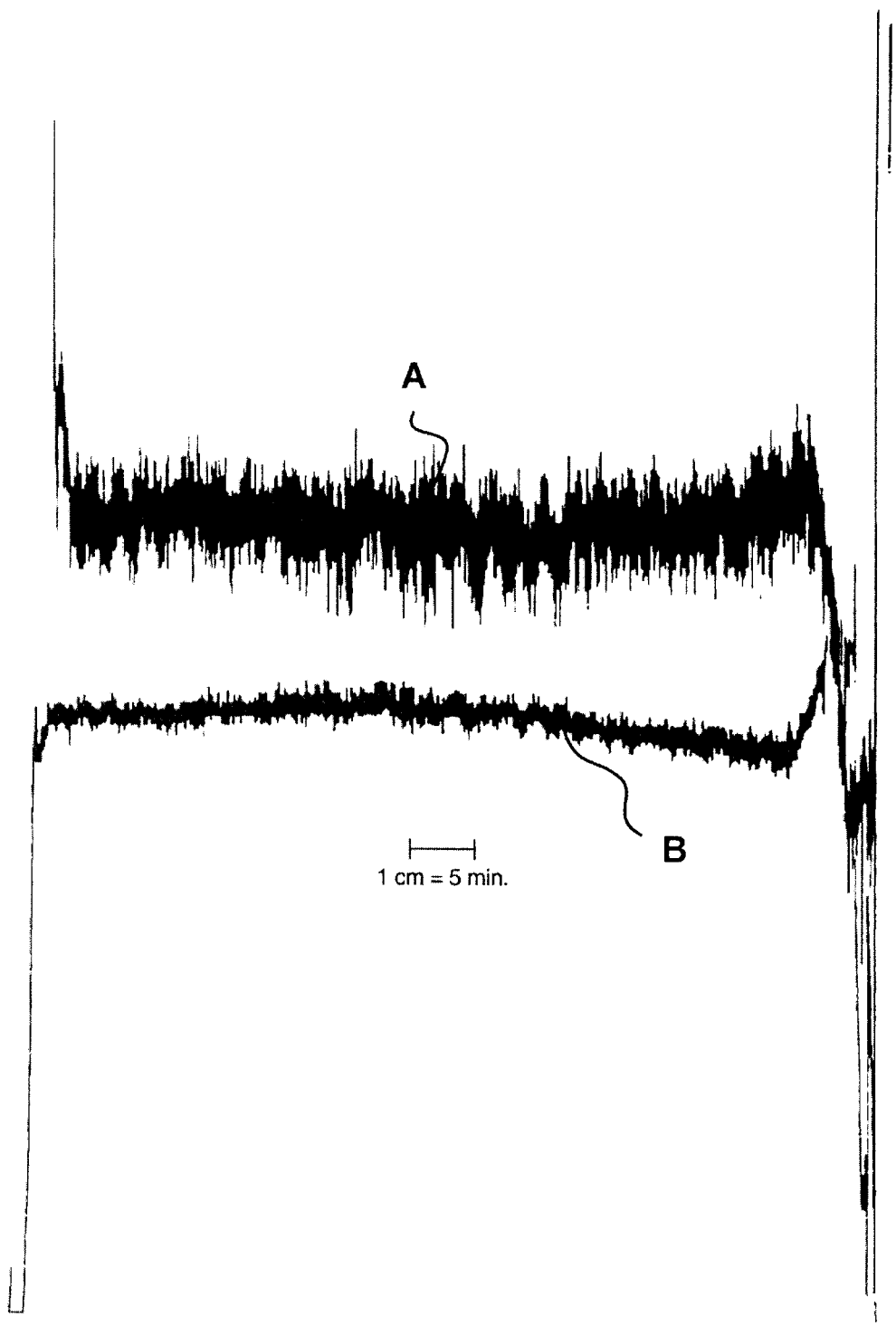
FIG. 11 shows two superposed graphs representing an example of the level of liquid metal as measured with a device found in the prior art (A) and with a system according to the present invention (B).

The commercially available capacitance probe was also installed in the side of the launder, about 30 cm away from the probe of the system. Then, the performance of the two probes was recorded on a same strip chart recorder over a period of about 60 minutes. The resulting graphs are shown in FIG. 11, where they are set in superposed manner for comparison. The graph A relates to the prior art device, while graph B relates to the novel system. As can be appreciated, the signal to noise ratio of the system (B) is much better than that of the other device (A). This is clearly visible from the fact that the amplitude of the oscillations of the recorder trace in graph A are about four times wider than that those of graph B.

The above-described example shows that the system is sufficiently sensitive to sense even a small increase in the level of the metal during the one hour test. It would be also able to sense a gradual increase followed by a slow decrease in the metal level. This was unlikely to be notice with the prior art device because of its higher noise to signal ratio, and thus its inherent lower sensitivity. Although possible embodiments of the present invention have been described in detail herein and illustrated in the accompanying figures, it is to be understood that the various aspects of the present invention are not limited to these precise embodiments and that various changes and modifications may be effected therein without departing from the scope or spirit of the present invention.

What is claimed is:

1. A method for detecting a level of liquid metal at a location, the method comprising the steps of:
    (a) providing an emitter coil and a receiver coil in a side-by-side configuration and in close proximity of the location;
    (b) applying an AC signal to the emitter coil for producing an alternating magnetic flux;
    (c) channeling the magnetic flux emanating from the emitter coil to the location through a first core element around which the emitter coil is provided, the first core element having a B/H value between 10,000 and 1,000,000;
    (d) channeling an inducing magnetic flux into the receiver coil through a second core element around which the receiver coil is provided, the second core element having a B/H value between 10,000 and 1,000,000;
    (e) sensing the level of the magnetic flux in the receiver coil; and
    (f) determining the level of liquid metal from the variation of the level of the magnetic flux in the receiver coil.

2. A method according to claim 1, wherein the first and second core elements are made of a material selected from a group consisting of MuMetal™, Hy Mu 80™, Magnifier 7904™, Permalloy™ and Hypernom™.

3. A method according to claim 1, further comprising the step of providing a third core element between the emitter coil and the receiver coil for further channeling the magnetic flux and the inducing magnetic flux.

4. A method according to claim 1, further comprising the step of monitoring the temperature of the coils, whereby, in step (f), the level of liquid metal is determined using both the variation of the signal in the receiver coil and the temperature of the coils.

5. A method according to claim 4, further comprising the step of performing a calibration and recording results of the calibration for later use in the determination of the level of liquid metal.

6. A method according to claim 1, wherein before step (a), the method comprises the step of providing an aperture through a side frame and exposing an outer side of a solid refractory portion therein, the receiver coil and the emitter coil being connected to the side frame while remaining at a substantially constant distance from the solid refractory portion.

7. A method according to claim 6, wherein in step (a), the receiver coil and the emitter coil are being held in an overlying disposition over the location.

8. A system for detecting a level of liquid metal at a location, the system comprising:
    an emitter coil and a receiver coil in a side-by-side configuration and in close proximity of the location;
    means for applying an AC signal to the emitter coil for producing an alternating magnetic flux;

a first core element configured and disposed to channel the magnetic flux emanating from the emitter coil to the location, the first core element having a B/H value between 10,000 and 1,000,000;

a second core element configured and disposed to channel the inducing magnetic flux into the receiver coil, the second core element having a B/H value between 10,000 and 1,000,000;

means for sensing the level of the induced magnetic flux in the receiver coil; and means for determining the level of liquid metal from the variation of the level of the induced magnetic flux in the receiver coil.

9. A system according to claim 8, wherein the receiver coil is wound around the first core element and the emitter coil is wound around the second core element.

10. A system according to claim 8, wherein the first and second core elements are made of a material selected from a group consisting of MuMetal™, Hy Mu 80™, Magnifier 7904™, Permalloy™ and Hypernom™.

11. A system according to claim 8, further comprising a third core element provided between the emitter coil and the receiver coil, the third core element further channeling the magnetic flux and the inducing magnetic flux.

12. A system according to claim 8, further comprising means for monitoring the temperature of the coils, whereby the means for determining the level of liquid metal are using both the variation of the level of induced magnetic flux in the receiver coil and the temperature of the coils.

13. A system according to claim 12, wherein the means for monitoring the temperature of the coils are selected from the group consisting of a RTD and a thermocouple.

14. A system for detecting a level of liquid metal at a location, the system comprising:

an emitter coil and a receiver coil in a side-by-side configuration and in close proximity of the location;

means for applying an AC signal to the emitter coil for producing an alternating magnetic flux;

a first core element configured and disposed to channel the magnetic flux emanating from the emitter coil to the location;

a second core element configured and disposed to channel the inducing magnetic flux into the receiver coil;

a receptacle in which the emitter coil, the receiver coil, the first core element and the second core element are mounted;

a fastening assembly to keep the receptacle against an outer side of a solid refractory portion exposed at the bottom of an aperture of a side frame;

means for sensing the level of the induced magnetic flux in the receiver coil; and means for determining the level of liquid metal from the variation of the level of the induced magnetic flux in the receiver coil.

15. A system according to claim 14, wherein the receptacle is made of a material selected from a group consisting of a carbon-carbon composite, alumina, silica, mullite, a combination of alumina and silica, and a combination of alumina and zirconia.

16. A system according to claim 14, wherein the fastening assembly comprises:

a hollow case rigidly connected to the side frame and in registry with the aperture;

at least two guiding elements rigidly connected to the receptacle and in sliding engagement with the case; and at least one compression spring provided between the receptacle and the case.

17. A system for detecting a level of liquid metal at a location, the system comprising:

an emitter coil and a receiver coil in a side-by-side configuration and in close proximity of the location, each coil having a corresponding electrically-insulated double-sheathed wire comprising:

a core made of a material selected from a group consisting of nickel, cooper, a nickel alloy and a cooper alloy;

a first sheath provided around the core and made of a high nickel-base content alloy;

an electrically-insulating material provided around the first sheath; and a second sheath enclosing the electrically-insulating material and made of a high nickel-base content alloy;

means for applying an AC signal to the emitter coil for producing an alternating magnetic flux;

a first core element configured and disposed to channel the magnetic flux emanating from the emitter coil to the location;

a second core element configured and disposed to channel the inducing magnetic flux into the receiver coil;

means for sensing the level of the induced magnetic flux in the receiver coil; and means for determining the level of liquid metal from the variation of the level of the induced magnetic flux in the receiver coil.

18. A system according to claim 17, wherein the electrically-insulating material is a heat-resistant ceramic powder.

19. A system according to claim 18, wherein the ceramic powder comprises magnesium oxide.

20. A system according to claim 19, wherein the first and second sheaths are made of Inconel 600™.

* * * * *